(12) United States Patent
Askinasi

(10) Patent No.: US 8,505,770 B2
(45) Date of Patent: Aug. 13, 2013

(54) PLUSH ANIMAL WASTE BAG DISPENSER

(75) Inventor: Barry Askinasi, Mt. Sinai, NY (US)

(73) Assignee: Four Paws Products, Ltd., Boise, ID (US)

( * ) Notice: Subject to any disclaimer, the term of this patent is extended or adjusted under 35 U.S.C. 154(b) by 487 days.

(21) Appl. No.: 12/582,235

(22) Filed: Oct. 20, 2009

(65) Prior Publication Data
US 2011/0089188 A1    Apr. 21, 2011

(51) Int. Cl.
*B65G 59/00*   (2006.01)
*B65H 83/00*   (2006.01)
*B65H 85/00*   (2006.01)
*G07F 11/00*   (2006.01)

(52) U.S. Cl.
USPC ............... 221/199; 221/282; 221/24; 221/45; 221/63; 221/33; 221/312 C; 446/73; 446/268; 446/72; 119/174; 383/24; 383/41; 383/67; 206/457; 206/216

(58) Field of Classification Search
USPC ............. 221/199, 282, 24, 45, 63, 33, 312 C; 446/73, 268, 72; 119/174; 383/24, 41, 67; 206/457, 216
See application file for complete search history.

(56) References Cited

U.S. PATENT DOCUMENTS

| | | | | |
|---|---|---|---|---|
| 2,484,776 | A * | 10/1949 | Zent et al. | 206/457 |
| 2,522,391 | A * | 9/1950 | McGonigle | 119/453 |
| 4,816,000 | A * | 3/1989 | Hsu | 446/74 |
| 5,375,928 | A * | 12/1994 | Yarng et al. | 383/24 |
| 5,680,978 | A * | 10/1997 | Pinion | 225/106 |
| 5,947,277 | A * | 9/1999 | Sherman | 206/216 |
| 6,129,240 | A * | 10/2000 | Morand | 221/63 |
| 6,189,730 | B1 * | 2/2001 | McClymonds | 221/46 |
| 6,223,695 | B1 * | 5/2001 | Edwards et al. | 119/796 |
| 6,237,787 | B1 * | 5/2001 | Gallo et al. | 215/12.1 |
| 6,240,881 | B1 * | 6/2001 | Edwards et al. | 119/795 |
| 6,536,707 | B2 * | 3/2003 | Adelakun | 242/598.6 |
| 6,688,305 | B1 * | 2/2004 | Perry | 128/202.16 |
| 6,763,988 | B2 * | 7/2004 | Huang | 225/43 |
| D498,955 | S | 11/2004 | Edwards | |
| 6,824,112 | B2 * | 11/2004 | Lange | 248/102 |
| 6,869,041 | B1 * | 3/2005 | Allegre et al. | 242/593 |
| 7,066,422 | B1 * | 6/2006 | Slocum | 242/593 |
| 7,380,687 | B2 * | 6/2008 | FitzSimons et al. | 221/45 |
| 7,506,615 | B1 * | 3/2009 | Sansone et al. | 119/867 |
| 7,806,291 | B2 * | 10/2010 | Anderson | 221/33 |
| 7,922,029 | B1 * | 4/2011 | Aretz et al. | 220/661 |
| 2006/0261076 | A1 * | 11/2006 | Anderson | 221/33 |
| 2007/0138196 | A1 * | 6/2007 | Nguyen | 221/33 |

* cited by examiner

*Primary Examiner* — Gene O. Crawford
*Assistant Examiner* — Rakesh Kumar
(74) *Attorney, Agent, or Firm* — Grossman, Tucker, Perreault & Pfleger, PLLC

(57) ABSTRACT

An animal waste bag dispenser wherein a roll of waste bags with the leading waste bag protruding from the center is inserted into a holder with an aperture on one end, and the holder is inserted into a plush animal with a second aperture aligned with the first aperture so that waste bags may be dispensed therefrom.

12 Claims, 6 Drawing Sheets

PLUSH ANIMAL WASTE BAG DISPENSER

FIELD OF THE INVENTION

The present invention relates to a dispenser of animal waste bags having a holder for containing a roll of waste bags with an aperture at one end that enables removal of the bags one at a time from the center of the roll of waste bags, with the holder being located within a plush animal figure that has a second co-aligned aperture for dispensing of the waste bags.

BACKGROUND OF THE INVENTION

When pet owners, and in particular dog owners, walk their pets in public areas, they are subject to various laws and ordinances requiring them to retrieve animal waste due to various sanitation and safety concerns. To help in retrieving animal waste, many pet owners carry disposable plastic bags. In most instances, the pet owners will place an inside-out bag over their hand, pick up the pet waste, turn the bags right side out and then seal the bag for disposal.

Many different holders for these animal waste bags have been developed. However, these holders tend to be plain dispensers that do not provide the convenience of being able to dispense from a roll of waste bags in an easy manner.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
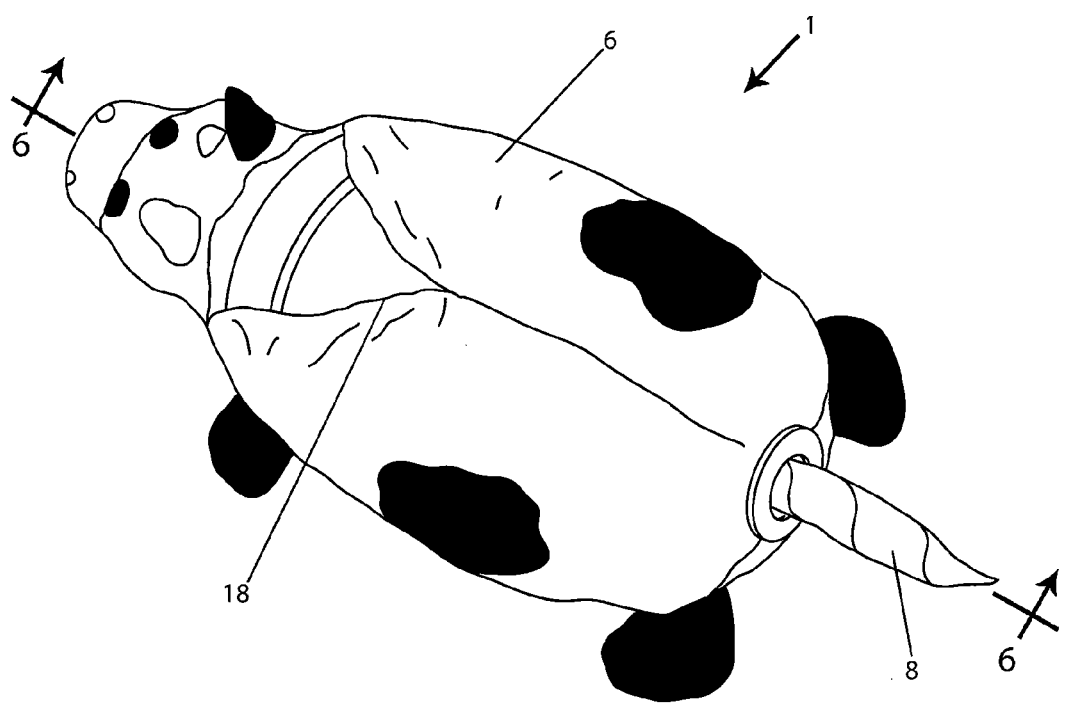
FIG. 1 is a top perspective view of the waste bag dispenser in accordance with one embodiment of the present invention.
Figure 2:
FIG. 2 is a bottom perspective view of the waste bag dispenser in accordance with one embodiment of the present invention.
Figure 3:
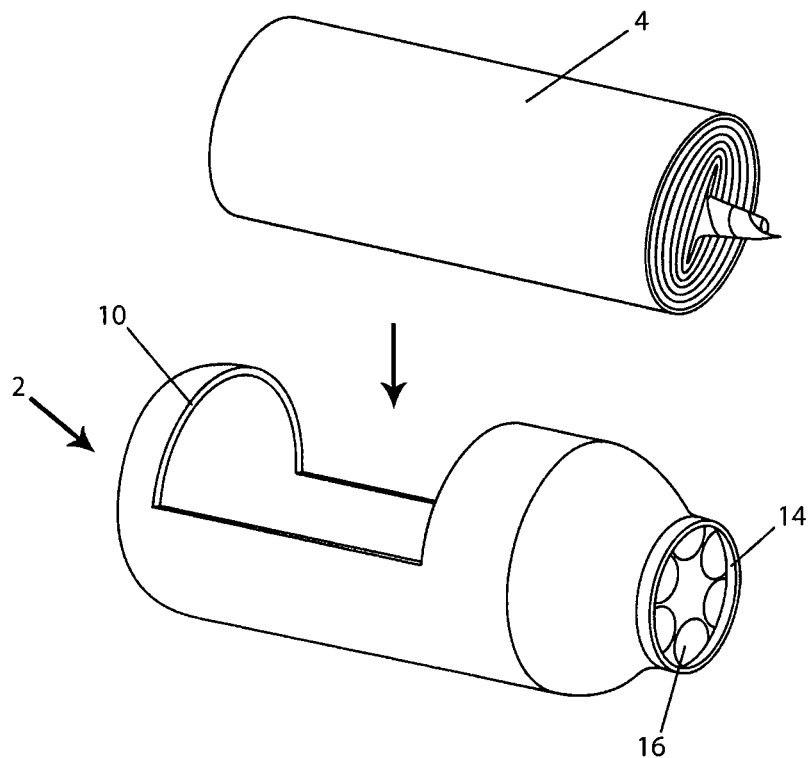
FIG. 3 is a perspective view of a roll of bags and the holder in accordance with one embodiment of the present invention.
Figure 4:
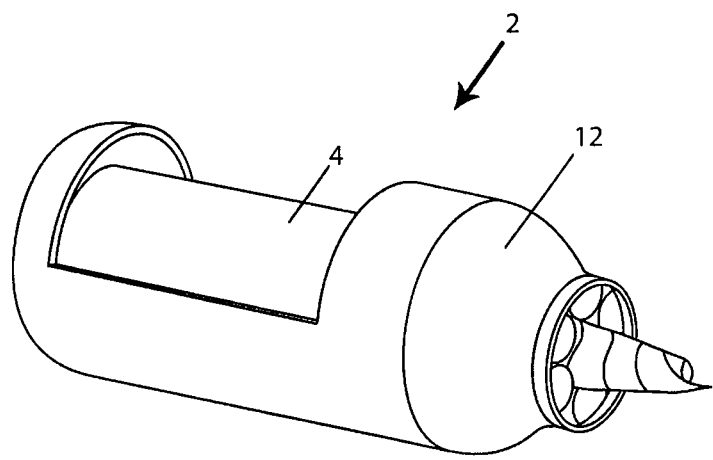
FIG. 4 is a perspective view of a roll of bags inserted into the holder in accordance with one embodiment of the present invention.
Figure 5:
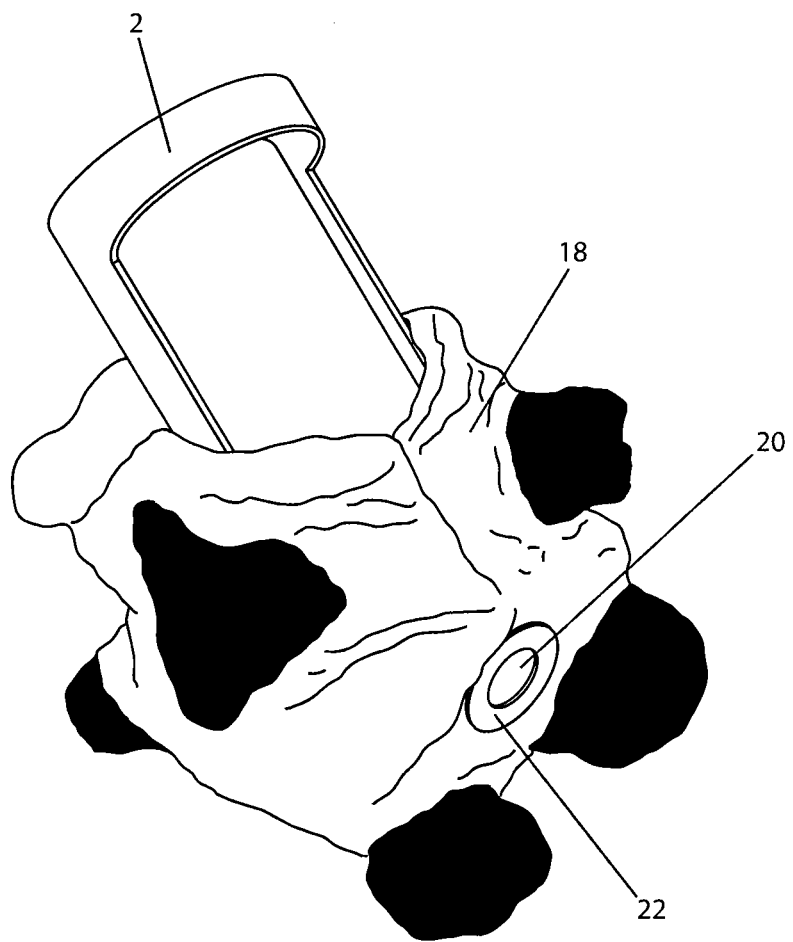
FIG. 5 is a view of a holder with a roll of bags that is partially inserted into a plush animal figure in accordance with one embodiment of the present invention.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The waste bag dispenser of the present invention is shown in FIGS. 1 through 7. Waste bag dispenser 1 is comprised of holder 2 that is held within plush animal FIG. 6. Roll of waste bags 4 are inserted into holder 2 with a lead bag extending out of one end of the holder. Holder 2 is then inserted into plush animal FIG. 6, with the lead bag extending out of the end of the plush animal figure. As apparent, the lead and subsequent bags are then dispensed through the apertures in the holder and plush animal figure.

Roll of bags 4 are comprised of plastic bags that are tightly rolled and configured to partially overlap between each consecutive bags. The bag at the center of the roll forms lead bag 8. Lead bag 8 is pulled from the center of the roll, and since the next subsequent bag overlaps with lead bag 8, the next bag is partially pulled out of the center of the roll along with lead bag 8. Thus, bags may be continuously pulled from the roll of bags.

Holder 2 may be comprised of a light, deformable material, such as plastic or rubber that substantially keeps its shape when subject to compression. In one embodiment, holder 2 may be cylindrical, but it may also be other shapes capable of containing a roll of waste bags. Holder 2 may contain window 10 that permits the roll of bags to be inserted into the holder. Window 10 is sufficiently sized so that the roll of bags may be inserted but, once inserted, the roll of bags will be maintained in position while the bags are dispensed. The window in one embodiment may extend substantially but not entirely from one end to the other end of holder 2 along the longitudinal direction, and may extend from 90 to 180 degrees along the circumference of the holder. Preferably, window 10 will not extend to each end so that a portion of the holder circumscribes each end of the roll of waste bags. The roll of waste bags will generally be equal to or smaller than the length of holder 2, and window 10 may be less than either the length of holder 2 or roll of bags 4. The insertion of roll of bags 4 through window 10 can be aided, in the situation where the length of the window is smaller than the length of the roll of bags, by having holder 2 made of a deformable material since the window will be capable of enlarging or deforming to fit the roll of bags inside the holder.

In another embodiment, holder 2 may be made of a hard, relatively inflexible material. The roll of bags may be inserted into the holder through a screw on cap, a snap-fit lid or any other suitable means of access to the interior of holder 2. Any other method for insertion of the roll of bags into the holder may be used.

One end of holder 2 contains taper 12 that ends in first aperture 14. Taper 12 helps to guide the roll of bags towards first aperture 14. First aperture 14 may contain resistance feature 16, which is a plurality of deformable flaps that provide resistance such that when the lead bag is pulled out, the lead bag separates from the next subsequent bag because of the resistance thereby leaving a portion of the subsequent bag outside of the roll of bags. Alternatively, first aperture 14 may simply be a hole sized to permit removal of lead bag 8, which may be sized to perform the same function as resistance feature 16. Generally, first aperture 14 will be located centrally within the end of holder 2.

After waste bag roll 4 is inserted in the cavity of holder 2, the leading portion of lead bag 8 is inserted through aperture 14. One of the benefits of window 10 is that it permits the user access to the interior of holder 2 so as to more easily enable insertion of lead bag 8 through first aperture 14 of the end of holder 2. After roll of bags 4 is inserted into holder 2, holder 2 is inserted into plush animal FIG. 6 through re-sealable pouch 18. Re-sealable pouch 18 may be an opening formed in the back of the plush animal with a velcro closing. The closing may also be through a zipper, button, overlapping fabric or similar methods of closing. Holder 2 is inserted such that first aperture 14 is placed adjacent to the bottom of the plush animal figure. Plush animal FIG. 6 contains a second aperture 20. First aperture 14 is placed over second aperture 20, and the user pulls the leading bag through second aperture 20. Grommet 22 may be used to maintain the shape of second aperture 20. Should it be desired, for amusement purposes, second aperture 14 may be located at the mouth or back end of the plush animal figure. In this manner, the roll of bags is disposed such that removal of the leading bag will cause the next subsequent bag to partially exit from the center of the roll of bags. The bags are continually dispensed from the roll of bags from waste bag dispenser 1 through first aperture 14 and second aperture 20.

Figure 6:
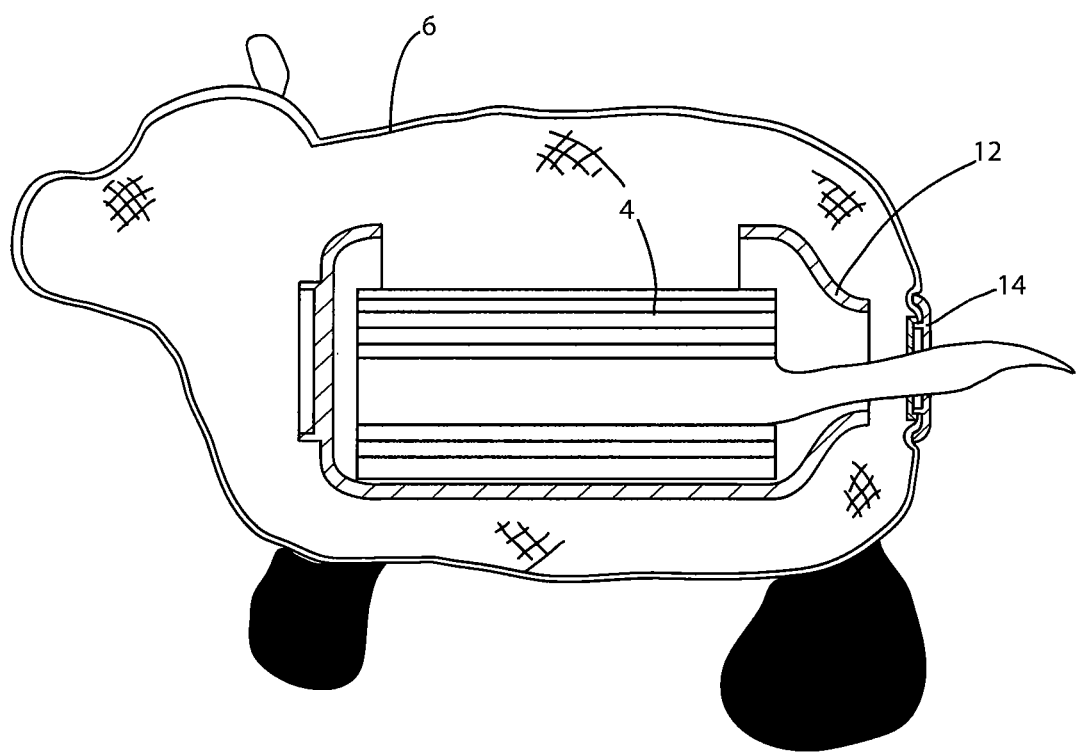
FIG. 6 is a side sectional view of the waste bag dispenser in accordance with one embodiment of the present invention.
Figure 7:
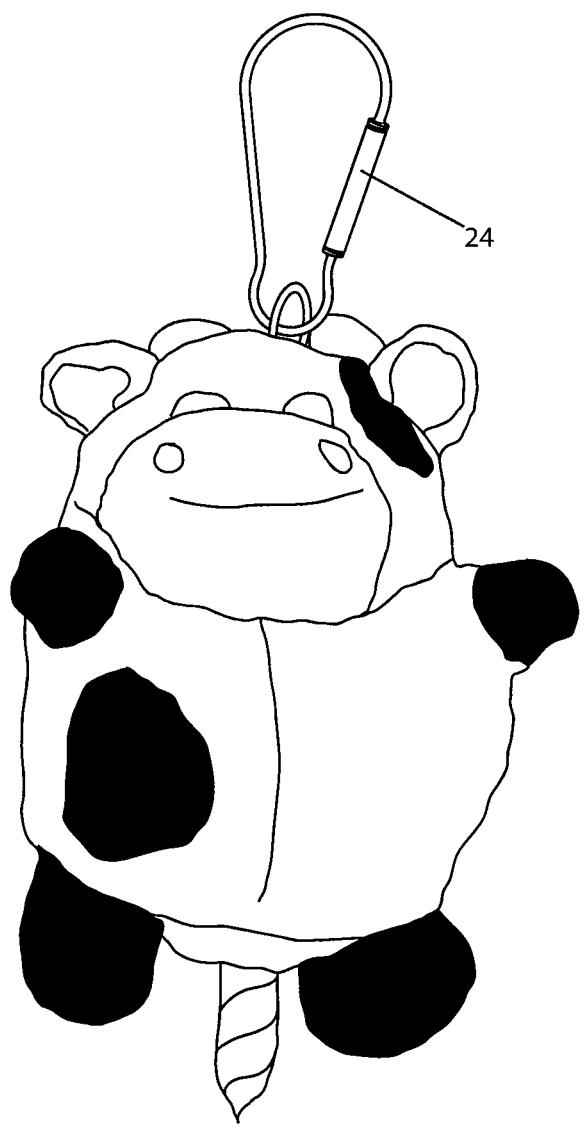
FIG. 7 is front view of the dispenser with a bag extending out of one end of the dispenser in accordance with one embodiment of the present invention.

Plush animal FIG. 6 may have attached to it a caribineer hook or similar attachment device 24. Attachment device 24 may alternatively be connected to holder 2. Attachment device 24 may be used to connect the waste bag dispenser to a dog leash, a backpack, or any other device that is taken with the pet owner when the pet is taken for a walk in a public area.

In another embodiment of the invention, bags may be dispensed through an aperture located in a position other than at the end of the dispenser. Likewise, the bags of the roll may be dispensed from the periphery of the roll, instead of the center of the roll.

While the invention has been particularly shown and described with reference to preferred embodiments thereof, it will be understood by those skilled in the art that various changes in form and details may be made therein without departing from the spirit and scope of the invention.

What is claimed is:

1. A waste bag dispenser comprising:
   a holder comprising a first end, a second end, an outer wall extending between the first and second ends, and a cavity defined by the first end, second end, and the outer wall, the cavity being configured to receive a roll of waste bags; and
   a plush animal figure comprising a back, a bottom and a re-sealable pouch interior to the plush animal figure for receiving the holder;
   wherein:
   the outer wall of the holder comprises a window extending between the first and second ends, the window having a radial arc between 90 and 180 degrees and sized to permit insertion of the roll of waste bags into the cavity;
   the second end of the holder comprises a first aperture configured to permit bags from the roll to be removed from the cavity one at a time;
   the back of the plush animal figure comprises a re-sealable opening for permitting insertion of the holder into the re-sealable pouch;
   the bottom of the plush animal figure comprises a second aperture;
   the holder is retained within the re-sealable pouch of the plush animal figure such that the first aperture of the holder is in in substantial alignment with the second aperture of the bottom plush animal figure so as to permit removal of one or more waste bags from the roll through the first and second apertures; and
   the window of the holder is in substantial alignment with the re-sealable opening in the back of the plush animal figure.

2. The waste bag dispenser of claim 1 wherein the holder is made of a semi-rigid material.

3. The waste bag dispenser of claim 1 further comprising: a carabineer hook attached to plush animal figure.

4. The waste bag dispenser of claim 1 further comprising: a grommet defining the second aperture.

5. The waste bag dispenser of claim 1 wherein the second aperture is located at a representation of an orifice of the plush animal.

6. The waste bag dispenser of claim 1 further comprising:
   a roll of waste bags contained within the cavity wherein bags are dispensed from the center of the roll through the first and second apertures.

7. A waste bag dispenser comprising:
   a substantially cylindrical holder having first end and a second end, the second end being tapered and ending in a first aperture;
   the cylindrical holder having a wall disposed between said first and second ends, said wall comprising means for insertion of a roll of waste bags into the holder; and
   a plush animal figure comprising a back, a bottom and a re-sealable pouch interior to the plush animal figure for receiving the holder;
   wherein:
   the back of the plush animal figure comprises a re-sealable opening for permitting insertion of the cylindrical holder into the re-sealable pouch;
   the bottom of the plush animal figure comprises a second aperture;
   the cylindrical holder is retained within the re-sealable pouch of the plush animal figure such that the first aperture of the holder is in in substantial alignment with the second aperture of the bottom plush animal figure so as to permit removal of one or more waste bags from the roll through the first and second apertures; and
   the means for insertion is in substantial alignment with the re-sealable opening in the back of the plush animal figure.

8. The waste bag dispenser of claim 7 wherein the holder is made of a semi-rigid material.

9. The waste bag dispenser of claim 7 further comprising: a carabineer hook attached to plush animal figure.

10. The waste bag dispenser of claim 7 further comprising: a grommet defining the second aperture.

11. The waste bag dispenser of claim 7 wherein the second aperture is located at a representation of an orifice of the plush animal.

12. The waste bag dispenser of claim 7 further comprising:
    a roll of waste bags contained within the cylindrical holder wherein bags are dispensed from the center of the roll through the first and second apertures.

* * * * *